United States Patent [19]

Chen et al.

[11] Patent Number: 5,177,048
[45] Date of Patent: Jan. 5, 1993

[54] SUPPLEMENTARY CATALYST FOR AMMOXIDATION CATALYSTS

[75] Inventors: Xin Chen; Lianghua Wu, both of Shanghai, China

[73] Assignee: China Petro-Chemical Corporation, Beijing, China

[21] Appl. No.: 786,790

[22] Filed: Nov. 4, 1991

[30] Foreign Application Priority Data

Nov. 5, 1990 [CN] China ............................ 90108809.9

[51] Int. Cl.$^5$ ............... B01J 21/02; B01J 21/08; B01J 23/88; B01J 27/78
[52] U.S. Cl. ............... 502/205; 502/212; 502/241; 502/242; 502/243; 502/246; 502/249; 502/250; 502/252; 502/255; 502/259; 502/260; 558/323; 558/324
[58] Field of Search ............... 558/323, 324; 502/205, 502/212, 241, 242, 243, 246, 249, 250, 252, 255, 259, 260

[56] References Cited

U.S. PATENT DOCUMENTS

| | | | |
|---|---|---|---|
| 3,882,159 | 5/1975 | Callahan et al. | 585/626 X |
| 4,162,234 | 7/1979 | Grasselli et al. | 502/311 X |
| 4,609,635 | 9/1986 | Canavesi et al. | 502/212 X |
| 4,757,038 | 7/1988 | Sasaki et al. | 502/215 X |
| 4,855,275 | 8/1989 | Suresh et al. | 502/205 X |

Primary Examiner—W. J. Shine
Assistant Examiner—Douglas J. McGinty
Attorney, Agent, or Firm—Nikaido, Marmelstein, Murray & Oram

[57] ABSTRACT

A supplementary catalyst for long term maintaining the activity of the fluidized bed catalysts for ammoxidation of propylene to produce acrylonitrile. Particularly, the present invention provides a supplementary catalyst for compensating for the loss of the fluidized bed catalyst caused by the volatilization of molybdenum and loss of fine particles during operation. By adopting the supplementary catalyst, the life-time of the fluidized bed catalysts for ammoxidation of propylene to produce acrylonitrile in fluidized bed reactors can be increased from 1-1.5 years to 4 or more than 4 years.

4 Claims, No Drawings

SUPPLEMENTARY CATALYST FOR AMMOXIDATION CATALYSTS

FIELD OF THE INVENTION

The present invention relates to a supplementary catalyst for oxidation catalysts, especially relates to a supplementary catalyst for fluidized bed catalysts for ammoxidation of propylene to produce acrylonitrile, more especially relates to a supplementary catalyst for long term maintaining the activity of the fluidized bed catalysts for ammoxidation of propylene to produce acrylonitrile.

BACKGROUND OF THE INVENTION

Many catalysts for ammoxidation of propylene to produce acrylonitrile are molybdenum containing poly-atomic catalysts. For example, the catalysts disclosed in U.S. Pat. No. 4,162,234 and Japanese Patent No. 58-2232 (corresponding to U.S. Pat. No. 4,228,098) are all molybdenum, bismuth and iron containing polycomponent catalysts. Chinese Patent CN86101301 discloses a molybdenum, bismuth and lead containing poly-component catalyst. Because the ammoxidation of propylene takes place at a temperature of 430°-470° C., and the volatilization of molybdenum component is unavoidable in any one of molybdenum-containing catalyst, thus the life-time of the catalyst is influenced. J. Buiten (J. Catal., 1968, 10(2), P. 188) provides a method to calculate the loss of molybdenum by means of the quantitative relation between the quantity of molybdenum volatilized and the temperature and the partial pressure of vapor.

Fluidized bed reactors are mostly used for producing acrylonitrile. Besides the influence of the volatilization of molybdenum, which makes the composition of the fluidized bed catalyst change, upon the activity of the catalyst, the contact efficiency between gas phase and solid phase also influences the optimum properties of the catalyst used in fluidized bed reactors. The amount of fine particles, especially the particles of less than 45 μm contained in fluidized bed catalysts influences directly the contact efficiency between gas phase and solid phase. If the amount of fine particles contained in fluidized bed catalyst is too low, for example, lower than 10 percent by weight, the conversion of propylene to acrylonitrile would decrease significantly.

In order to solve the above-mentioned problems, many methods have been proposed to maintain the stable operation of the fluidized bed reactor for producing acrylonitrile. For example, Japanese Patent No. 63-30065 proposes a method that the catalyst in the fluidized bed reactor is discharged from the reactor after a period of operation, and the discharged catalyst is reintroduced into the reactor for operation after the compensation of the loss of molybdenum component of said fluidized bed catalyst. U.S. Pat. No. 3,882,159 proposes to add molybdenum oxide or inert particles containing molybdenum oxide into the reactor. U.S. Pat. No. 4,590,011 proposes a method that a partial catalyst is drawn out from the reactor after a period of operation, the catalyst drawn out is screened to remove the big particles and is then reintroduced into the reactor for operation; or fine inert particles are added into the reactor to compensate the loss of fine catalyst particles in said fluidized bed catalyst. Japanese Patent No. 63-30065 discloses a method that the fluidized bed catalyst used in a fluidized bed reactor for a long period is pulverized by means of pulverizer to increase the amount of fine particles in said fluidized bed catalyst.

The above-mentioned methods have some shortcomings. The methods of drawing out catalyst from the fluidized bed reactor and compensating the loss of molybdenum component, or increasing the amount of fine particles contained in the fluidized bed catalyst by means of screening and crushing have the shortcomings that the operation of the reactor must be stopped which will result in economic loss. In addition, apart from the inconvenience of the treatment of the drawn out catalyst, the catalyst particles after being crushed are no longer spherical particles, which will influence the fluidization in the reactor. When molybdenum oxide or the material containing molybdenum oxide is added into the reactor, although the loss of molybdenum can be compensated, but as the material added into the reactor is mixed mechanically with the original fluidized bed catalyst, therefore, more molybdenum oxide would flow out from the reactor due to the differences between their physical properties, which will result in the easy block-up of the following condensers, and said condensers must be purged regularly.

OBJECT OF THE INVENTION

The object of the present invention is to provide a supplementary catalyst for fluidized bed catalysts for ammoxidation of propylene to produce acrylonitrile, said supplementary catalyst can solve the problems of the loss of molybdenum component and the loss of fine particles in said fluidized bed catalysts during operation without stopping the operation of the reactor, and can ensure said fluidized bed catalysts operate stably in the reactor for a long period.

SUMMARY OF THE INVENTION

The supplementary catalyst for fluidized bed catalysts for ammoxidation of propylene to produce acrylonitrile comprises a silica support and a composite of the formula:

$$A_aB_bC_cD_dFe_fBi_gMo_hO_x$$

wherein

A is potassium, sodium, rubidium, cesium, thallium, samarium or a mixture thereof;
B is manganese, magnesium, calcium, strontium, barium, lead or a mixture thereof;
C is phosphorus, arsenic, boron, antimony, chromium, tungsten or a mixture thereof;
D is cobalt, nickel or a mixture thereof;
and
a is in the range of 0.01-1;
b is in the range of 0-10;
c is in the range of 0.01-2;
d is in the range of 4-10;
f is in the range of 0.1-8;
g is in the range of 0.01-6;
h is in the range of 12-16; and
x is the number of oxygens required to satisfy the valence requirements of the other elements present, the content of $SiO_2$ in said supplementary catalyst is in the range of 30-70 percent by weight, the excess molybdenum oxide index is 2-8.

DETAILED DESCRIPTION OF THE INVENTION

The present invention discloses a supplementary catalyst for fluidized bed catalysts for ammoxidation of propylene to produce acrylonitrile. said supplementary catalyst has the composition same as or similar to that of the original fluidized bed catalyst, except the content of molybdenum component. The content of molybdenum component in the supplementary catalyst of the present invention is higher than that in the original fluidized bed catalysts. the content of fine particles of less than 45 μm in the supplementary catalyst of the present invention is in the range of 50-60 percent by weight based on the total weight of the supplementary catalyst. The excess molybdenum component in the supplementary catalyst of the present invention forms a solid solution with other components therein rather than a mechanical mixture, and no free molybdenum oxide exists. The supplementary catalyst of the present invention comprises $SiO_2$ support and a composite of the formula:

$$A_a B_b C_c D_d Fe_f Bi_g Mo_h O_x$$

wherein

A is potassium. sodium, rubidium, cesium, thallium. samarium or a mixture thereof;

B is manganese. magnesium. calcium. strontium, barium. lead or a mixture thereof;

C is a phosphorus. arsenic. boron. antimony. chromium, tungsten or a mixture thereof;

D is a cobalt. nickel or a mixture thereof;

and a is in the range of 0.01-1, preferably in the range of 0.1-0.6;

b is in the range of 0-10. preferably in the range of 1-8;

c is in the range of 0.01-2. preferably in the range of 0.05-1.5;

d is in the range of 4-10, preferably in the range of 5-8;

f is in the range of 0.1-8, preferably in the range of 0.5-5;

g is in the range of 0.01-6, preferably in the range of 0.1-4;

h is in the range of 12-16, preferably in the range of 13-15; and x is the number of oxygens required to satisfy the valence requirements of the other elements present, and the content of $SiO_2$ support in said supplementary catalyst is in the range of 30-70 percent by Weight, preferably in the range of 40-60 percent by weight based on the total weight of said supplementary catalyst.

The excess quantity of molybdenum oxide in the supplementary catalyst of the present invention can be expressed by "excess molybdenum oxide index", defined as the sum of the positive charges of cations and the negative charges of the catalyst divided by minus 2.

If a cation has several valences, its lower valence is selected for calculation. For example, the valence 2 of iron is selected rather than 3.

And if an anion is a polybasic acid, the higher valence of its acid radical is selected for calculation. For example. the valence minus 3 of phosphoric acid radical is selected. For example, the calculation of excess molybdenum oxide index of a catalyst containing the composite $$Mo_{12}P_{0.5}Fe_3Bi_1Ni_{2.5}Co_{4.5}K_{0.1}$$

is as follows:

Sum of the positive charges is $$3\times 2 - 1\times 3 - 2.5\times 2 - 4.5\times 2 - 0.1\times 1 = 23.1$$

Sum of the negative charges is $$12\times(-2)+0.5\times(-3) = -25.5$$

Excess molybdenum oxide index is $$\frac{(-25.5) + 23.1}{(-2)} = 1.2$$

The prior patents about molybdenum catalyst have not given their excess molybdenum oxide index, but the index can be calculated according to their compositions. The excess molybdenum oxide index of most catalysts in the prior art are zero or slightly higher than zero.

The excess molybdenum oxide index of the supplementary catalyst of the present invention is in the range of 2-8, preferably in the range of 2.5-6.

Because the supplementary catalyst of the present invention contains excess molybdenum component, the activity of the supplementary catalyst is lower than the activity of the original catalyst. After a period of operation in a fluidized bed reactor, the catalytic activity of the supplementary catalyst will increase to the level of the original fluidized bed catalyst due to the gradual volatilization of the molybdenum component in the supplementary catalyst of the present invention. By adopting the supplementary catalyst of the present invention, the composition of the fluidized bed catalyst in fluidized bed reactors can be maintained stably for a long time.

The amount and interval for adding the supplementary catalyst into a reactor have no strict limitations. The amount of the supplementary catalyst added into the reactor should be equal to or more than the amount of the catalyst carried out from the reactor.

The interval for adding said supplementary catalyst into a fluidized bed reactor containing fluidized bed catalyst must be as short as possible, and the amount of the supplementary catalyst added into the reactor each time must be relatively low.

The supplementary catalyst of the present invention is only used for supplementation, and it can not be used alone as the catalyst for producing acrylonitrile.

The present invention is described further, but not limited with the following example.

EXAMPLE

A supplementary catalyst of the present invention was prepared as follows:

45.3 g ammonium molybdate was dissolved in 530 ml hot water. 83.2 g bismuth nitrate was dissolved in a solution of 29 ml concentrated nitric acid and 230 ml water. The two solutions prepared thereby were mixed and adjusted with ammonia water to have a pH of 2.8. A suspension (I) having white precipitate was thus obtained 139.8 g iron nitrate, 224.6 g cobalt nitrate, 125.9 g nickel nitrate. 46.7 ml 50 (wt.) % manganese nitrate, 33.8 ml 10 (wt.) % cesium nitrate, and 33.8 g chromium nitrate were mixed, then 50 ml water was added into the mixture to have the solids in the mixture dissolved. Thus a solution (II) was obtained.

369.5 g ammonium molybdate was dissolved in 300 ml water, 1250 g silica sol was added into the ammonium molybdate solution, and then mixed with 4.2 g 45(wt.) % potassium hydroxide solution to obtain a solution (III). The silica sol used herein contained 40 (wt.) % of $SiO_2$ and 1100 ppm of sodium, and said silica sol was ammonium-stabilized silica sol.

Suspension (I) and solution (II) were added into solution (III) and stirred thoroughly to prepare a slurry. Said slurry was heat concentrated to have a solid content of 48 (wt) % and the slurry was then spray-dried in a spray-drier according to conventional method to obtain microspheres followed by calcining at 690° C. for 1 hour in a rotating oven having an inner diameter of 89 mm and a length of 1700 mm(Φ89X1700). The prepared supplementary catalyst had a composition as follows:

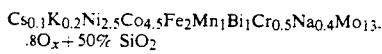

The content of the fine particles of less than 45 μm in said supplementary catalyst is 60 percent by weight based on the total weight of the supplementary catalyst, and the excess molybdenum oxide index is 3.0.

The activity test of long term operation of fluidized bed catalyst was carried out in a large scale fluidized bed reactor having an inner diameter of 2 meters. The fluidized bed catalyst having the composition of:

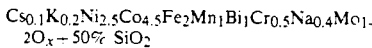

was introduced into said reactor, the reaction temperature was 425°–430° C., reaction pressure was 0.05 MPa, the linear velocity was 0.58 m/sec, WWH was 0.085, and propylene: ammonium: air - 1:1.15:10.6 (in molar ratio).

The supplementary catalyst of the present invention having the composition of:

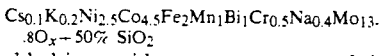

was added into said reactor at one week intervals.

In the beginning three months, the single pass yield of acrylonitrile decreases from a yield of 82% at the initial activity to the normal range of 77–78%. In the following 40 months afterwards, the single pass yield of acrylonitrile remained in the range of 76–78%. The consumption of the supplementary catalyst of the present invention was 0.4–0.5 Kg per ton of acrylonitrile.

If the supplementary catalyst of the present invention was not added, the single pass yield of acrylonitrile would decrease to less than 75% after 18 months continuous operation. And the total catalyst would have to be discharged from the reactor and to be dealt with or to be replaced by fresh catalyst.

What is claimed is:

1. A supplementary catalyst to maintain the activity of the molybdenum containing fluidized bed catalysts for ammoxidation of propylene to produce acrylonitrile, comprising a silica support and a composite of the formula

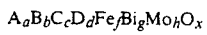

wherein

A is potassium, sodium, rubidium, cesium, thallium, samarium or a mixture thereof;

B is manganese, magnesium, calcium, strontium, barium, lead or a mixture thereof;

C is phosphorus, arsenic, boron, antimony, chromium, tungsten or a mixture thereof;

D is cobalt, nickel or a mixture thereof;

and a is in the range of 0.01–1;

b is in the range of 0–10;

c is in the range of 0.01–2;

d is in the range of 4–10;

f is in the range of 0.1–8;

g is in the range of 0.01–6;

h is in the range of 12–16; and x is the number of oxygens required to satisfy the valence requirements of the other elements present, the content of $SiO_2$ in said supplementary catalyst is in the range of 30–70 percent by weight based on the total weight of said supplementary catalyst, and an excess molybdenum oxide index is in the range of 2–8.

2. The supplementary catalyst of claim 1, wherein a is in the range of 0.1–0.6;

b is in the range of 1–8;

c is in the range of 0.05–1.5;

d is in the range of 5–8;

f is in the range of 0.5–5;

g is in the range of 0.1–4;

h is in the range of 13–15; and x is the number of oxygens required to satisfy the valence requirements of the other elements present, the content of $SiO_2$ in said catalyst is in the range of 40–60 percent by weight based on the total weight of said supplementary catalyst.

3. The supplementary catalyst of claim 1, wherein an amount of fine particles of less than 45 μm in said supplementary catalyst is in the range of 50–60 percent by weight based on the total weight of said supplementary catalyst.

4. The supplementary catalyst of claim 1, wherein the excess molybdenum oxide index of said supplementary catalyst is in the range of 2.5–6.

* * * * *